(12) United States Patent
Saigo et al.

(10) Patent No.: US 8,544,307 B2
(45) Date of Patent: Oct. 1, 2013

(54) APPARATUS FOR PRODUCING MOTOR COIL

(75) Inventors: Takeshi Saigo, Nagoya (JP); Hiroaki Urano, Miyoshi (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 387 days.

(21) Appl. No.: 12/935,442

(22) PCT Filed: Apr. 24, 2009

(86) PCT No.: PCT/JP2009/058125
§ 371 (c)(1),
(2), (4) Date: Sep. 29, 2010

(87) PCT Pub. No.: WO2010/122656
PCT Pub. Date: Oct. 28, 2010

(65) Prior Publication Data
US 2011/0048092 A1 Mar. 3, 2011

(51) Int. Cl.
*B21C 47/02* (2006.01)
*B21F 3/00* (2006.01)

(52) U.S. Cl.
USPC ............................ 72/147; 140/124; 242/324.1

(58) Field of Classification Search
USPC .................. 72/146, 147, 130, 183; 140/124; 29/602.1, 605; 242/324.1–324.3, 433, 554.5, 242/563
See application file for complete search history.

(56) References Cited

U.S. PATENT DOCUMENTS

| | | | | |
|---|---|---|---|---|
| 4,687,151 A | * | 8/1987 | Memminger et al. | 242/420.5 |
| 2010/0000624 A1 | * | 1/2010 | Matsushita et al. | 140/124 |

FOREIGN PATENT DOCUMENTS

| | | |
|---|---|---|
| JP | 03-291123 | 12/1991 |
| JP | 06-078502 A | 3/1994 |
| JP | 06-163298 | 6/1994 |
| JP | 2685335 A | 8/1997 |
| JP | 2007-169017 A | 7/2007 |
| JP | 2008-071983 A | 3/2008 |
| JP | 2008-178199 A | 7/2008 |
| JP | 2008-228435 A | 9/2008 |
| WO | 2008/087994 A1 | 7/2008 |

* cited by examiner

*Primary Examiner* — Debra Sullivan
(74) *Attorney, Agent, or Firm* — Kenyon & Kenyon LLP (57) ABSTRACT

An apparatus for producing a motor coil is to produce a coil to be used for a stator of a motor by automatically winding a flat rectangular conductive wire by use of a winding machine. This apparatus comprises: an uncoiler for feeding the conductive wire wound and accumulated on a bobbin to the winding machine; an inertia measuring device for measuring inertia of the uncoiler when feeding the conductive wire; chucks and for measuring a resistance value of the conductive wire; and an operating console for setting the winding condition of the rectangular wire to be wound by the winding machine based on the measured inertia and the measured resistance value. The operating console controls the winding machine based on the set winding condition to wind the conductive wire.

5 Claims, 12 Drawing Sheets

|  | S1 | S2 | S3 | S4 |
|---|---|---|---|---|
| A(Cu) | CONDITION 1 | CONDITION 2 | CONDITION 3 | CONDITION 4 |
| B(Al) | CONDITION 5 | CONDITION 6 | CONDITION 7 | CONDITION 8 |
| C(Fe) | CONDITION 9 | CONDITION 10 | CONDITION 11 | CONDITION 12 |
| D | CONDITION 13 | CONDITION 14 | CONDITION 15 | CONDITION 16 |
| E | CONDITION 17 | CONDITION 18 | CONDITION 19 | CONDITION 20 |
| F | CONDITION 21 | CONDITION 22 | CONDITION 23 | CONDITION 24 |

APPARATUS FOR PRODUCING MOTOR COIL

This is a 371 national phase application of PCT/JP2009/058125 filed 24 Apr. 2009, the content of which is incorporated herein by reference.

TECHNICAL FIELD

The present invention relates to an apparatus for producing a coil used in a stator of a motor, and more specifically, an apparatus for producing a motor coil by automatically winding a conductive wire.

BACKGROUND ART

Heretofore, as a technique of this type, there has been known a winding apparatus disclosed in Patent Literature 1 indicated below. This apparatus is arranged to supply and wind a hoop material made of an aluminum strip or a copper strip and a round conductive wire or a flat rectangular conductive wire to configure a primary coil and a secondary coil respectively. For supplying these conductive wires, a winding frame is placed in a fixed position and will be rotated to sequentially produce the primary coil and the secondary coil by switching a plurality of conductive wires.

CITATION LIST

Patent Literature

Patent Literature 1: JP2008-71983A
Patent Literature 2: JP06 (1994)-078502A

SUMMARY OF INVENTION

Technical Problem

However, the winding apparatus in Patent Literature 1 does not comprise a device for identifying kinds (materials) of conductive wires to be used, and therefore there is a possibility that an operator wrongly places a different kind of wire on the winding machine. Especially, conductive wires are coated with insulating films or the like and therefore it is difficult to identify the material of a conductive wire based on its outer appearance. Therefore, the wrong setting of a conductive wire could not completely be avoided. Further, for producing a predetermined standardized coil by winding a conductive wire, a winding condition has to be adjusted in accordance with each kind of the conductive wire. In that sense, in a case a wrong wire is used by error, the produced coil might have undesired twist(s) and others due to the wrong winding condition.

For example, not only copper but also aluminum may be applied as a conductive wire to be used for producing a coil in view of cost reduction. However, since copper and aluminum have different characteristics such as resistance and machinability (hardness), they also have different wire winding conditions. Further, a copper conductive wire and an aluminum conductive wire are coated with enamel serving as an insulating film, making it difficult to identify each material from each outer appearance. Thus, the copper wire and the aluminum wire may be wrongly used. In this case, the conductive wire cannot be wound under the proper winding condition, so that the produced coil could cause a twist.

The present invention has been made to solve the above problem and has a purpose to provide an apparatus for producing a motor coil, the apparatus being able to appropriately produce a coil by properly winding a conductive wire in accordance with a kind of the conductive wire to be used.

Solution to Problem (1) To achieve the above object, a first aspect of the present invention provides an apparatus for producing a coil to be used for a stator of a motor by automatically winding a flat rectangular conductive wire by use of a winding machine, the apparatus comprising: a characteristics measuring device for measuring characteristics of a conductive wire; a winding condition setting device for setting a winding condition of the conductive wire to be wound by the winding machine based on the measured characteristics; and a control device for controlling the winding machine based on the set winding condition.

According to the above configuration, characteristics of a conductive wire is measured by the characteristics measuring device and a winding condition of the conductive wire wound by the winding machine is set by the winding condition setting device based on thus measured characteristics of the conductive wire. Further, the winding machine is controlled by the control device based on the thus set winding condition. Therefore, even if the kind (material) of a conductive wire to be used is changed, a conductive wire is wound by the winding machine based on the winding condition corresponding to the characteristics of each conductive wire.

(2) To achieve the above object, in the coil production apparatus described in (1), preferably, the conductive wire wound and accumulated on a bobbin is fed from an uncoiler and wound by the winding machine.

According to the above configuration, in addition to the operation in (1), the conductive wire can be smoothly supplied from the uncoiler to the winding machine.

(3) To achieve the above object, in the coil production apparatus described in (2), preferably, the characteristics measuring device includes: an inertia measuring device for measuring inertia of the uncoiler when feeding the conductive wire; and a resistance measuring device for measuring a resistance value of the conductive wire.

According to the above configuration, in addition to the operation in (2), the inertia of the uncoiler and the resistance value of the conductive wire are adopted as the characteristics of the conductive wire, so that a material of the conductive wire is identified by the inertia and the resistance value and reflected on the winding condition.

(4) To achieve the above object, in the coil production apparatus described in (2) and (3), preferably, the winding machine includes: a clamp device for clamping the conductive wire at a predetermined pressure; and a bending device for bending the conductive wire at a predetermined bending angle, the winding condition setting device sets the pressure to be applied by the clamp device and the bending angle to be attained by the bending device, and the control device controls the clamp device based on the set pressure value and controls the bending device based on the set bending angle.

According to the above configuration, in addition to the operations in (2) and (3), the pressure to clamp the conductive wire by the clamp device and the bending angle of the conductive wire by the bending device are both controlled. Accordingly, an edgewise-bent type conductive wire can be properly wound.

Advantageous Effects of Invention

According to the first aspect of the invention, a conductive wire can be properly wound to produce a coil corresponding to each kind of a conductive wire to be used.

DESCRIPTION OF EMBODIMENTS

A detailed description of a preferred embodiment of an apparatus for producing a motor coil embodying the present invention will now be given referring to the accompanying drawings.

Figure 1:
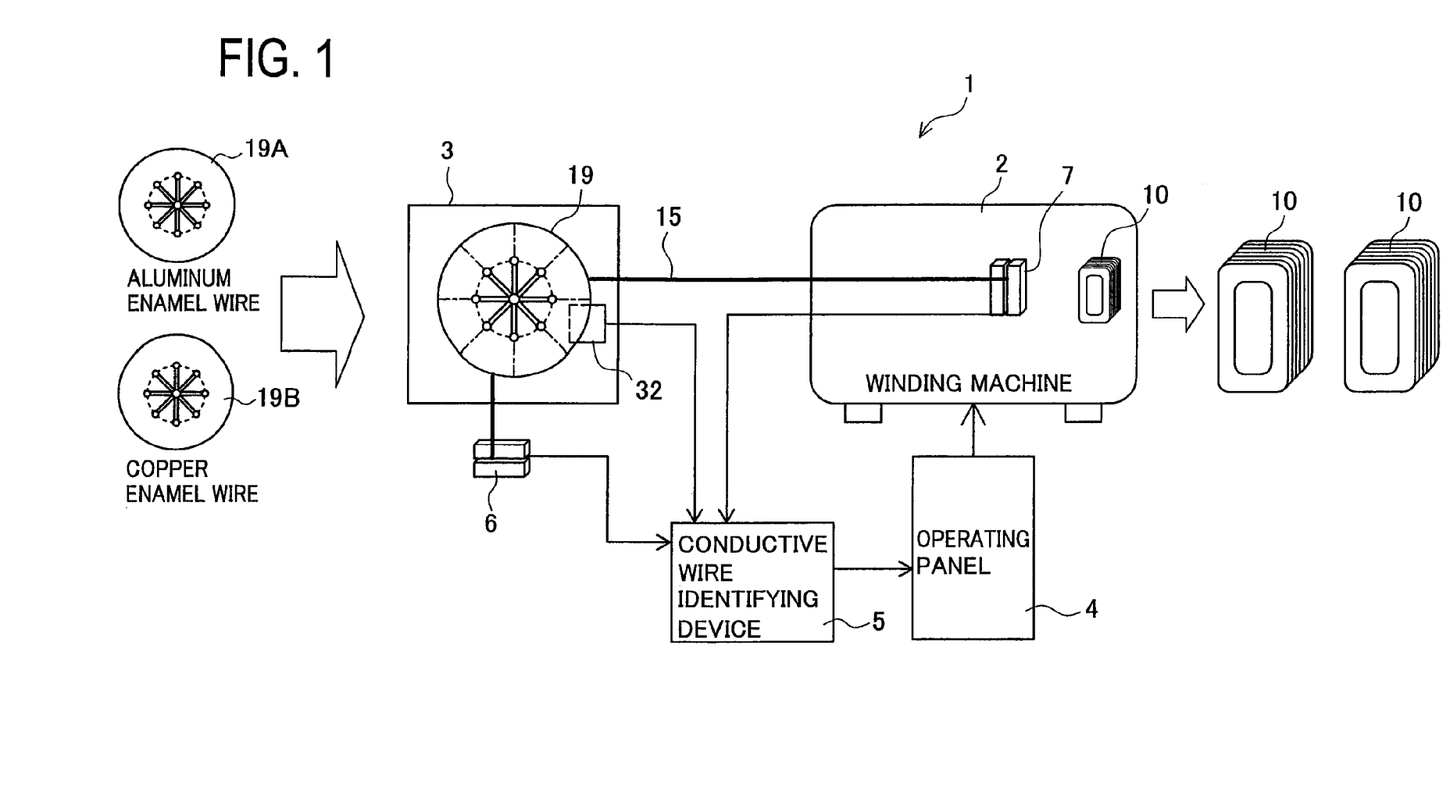
FIG. 1 is a schematic view showing a coil production apparatus.
Figure 2:
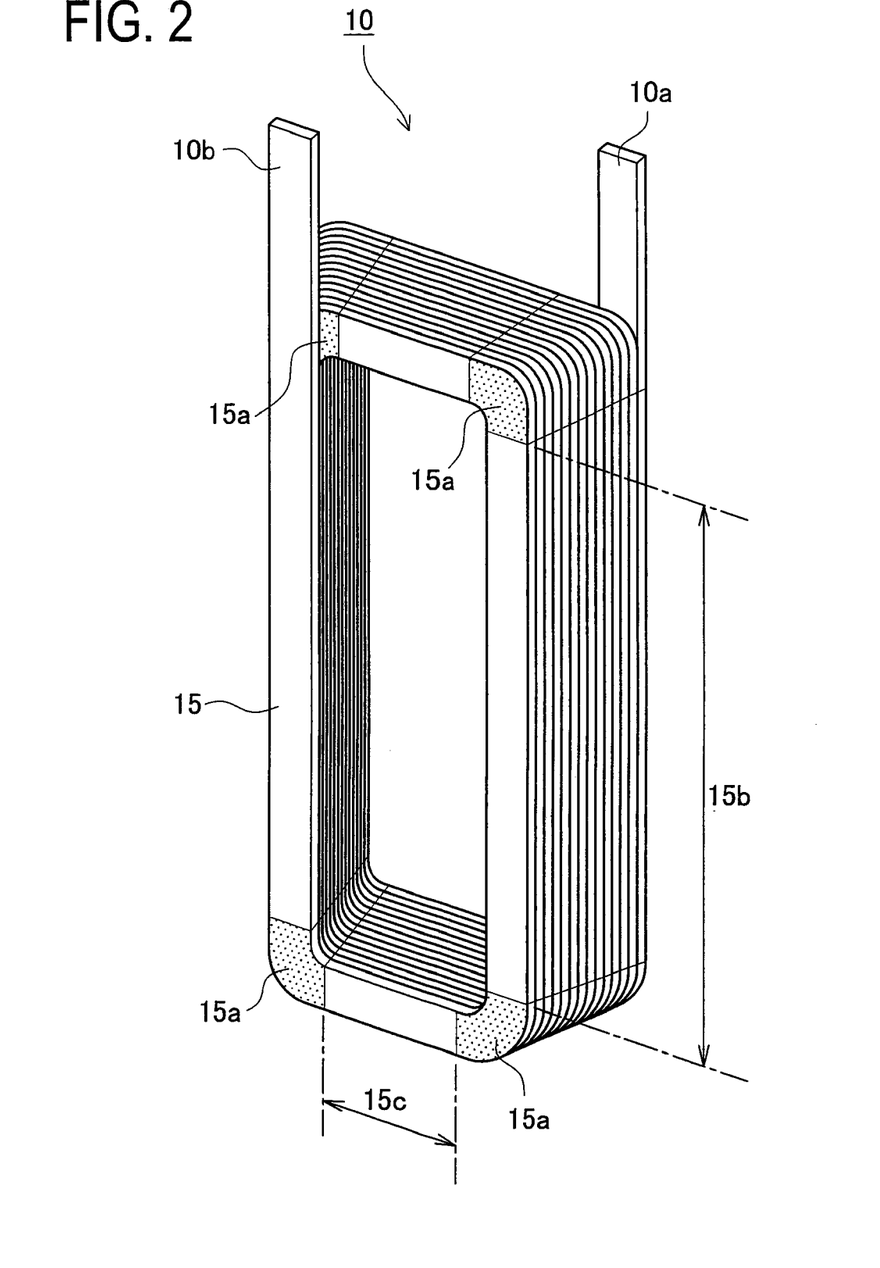
FIG. 2 is a perspective view of a coil.
Figure 3:
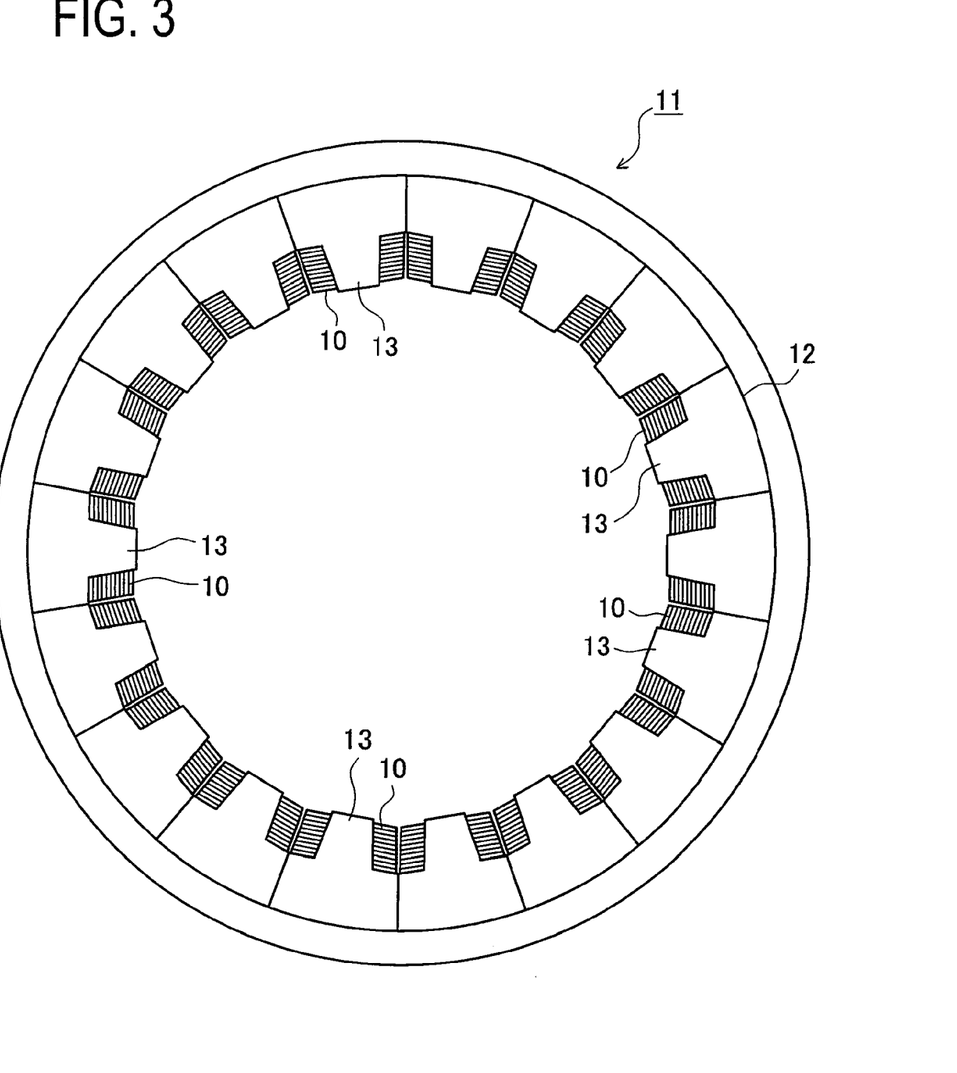
FIG. 3 is a plan view of a stator including a cutaway view of a coil.

FIG. 1 shows a schematic configuration of an apparatus for producing a motor coil (hereinafter, referred as "a coil production apparatus") 1 in the present embodiment. FIG. 2 is a perspective view of a coil 10 produced by this coil production apparatus 1. FIG. 3 is a plan view of a stator 11 produced by use of the coil(s) 10 shown in FIG. 2, the figure including a cutaway view of the coil 10.

As shown in FIG. 2, the coil 10 is formed of a flat rectangular conductive wire 15 that is spirally wound to conform to the outer shape of a tooth 13 provided in a stator core 12 which forms the stator 11 as shown in FIG. 3. The coil 10 includes long sides 15b and short sides 15c formed of the conductive wire 15 so that the short sides 15c are gradually longer from the inner periphery side to the outer periphery side of the stator core 12 as shown in FIG. 2. The conductive wire 15 is made of a good conductive metal, such as copper and aluminum, formed in a strip shape. The outer periphery of the conductive wire 15 is coated with an insulating coating. As the insulating coating, a resin capable of ensuring insulation such as enamel, polyimide, and amideimide is used. However, both ends of the flat rectangular conductive wire 15 forming the coil 10, i.e., a terminal 10a on an outer peripheral side and a terminal 10b on an inner peripheral side include exposed portions from which the insulating coating has been removed to expose the material of the conductive wire 15. Such the coils 10 are placed on the stator core 12 to produce the stator 11 shown in FIG. 3. The coil ends of the stator 11 are covered by resin-molding or others to finish the stator 11 as a final product. Further, this final product of the stator 11 is covered by a casing, a rotor produced separately is mounted in a hollow portion of the stator 11, and then the motor is finally produced.

Figure 4:
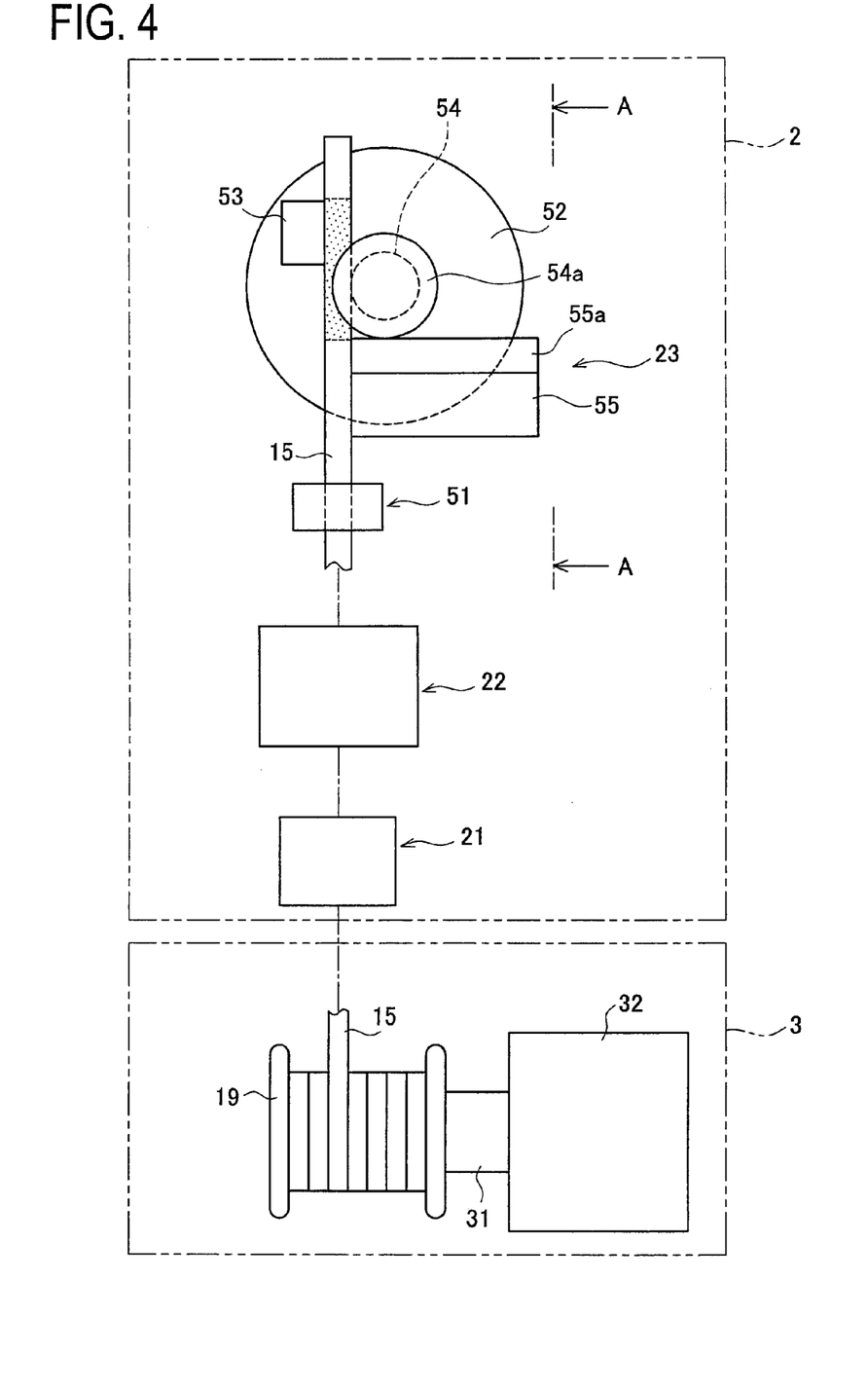
FIG. 4 is a schematic view showing a configuration of a winding machine and an uncoiler.
Figure 5:
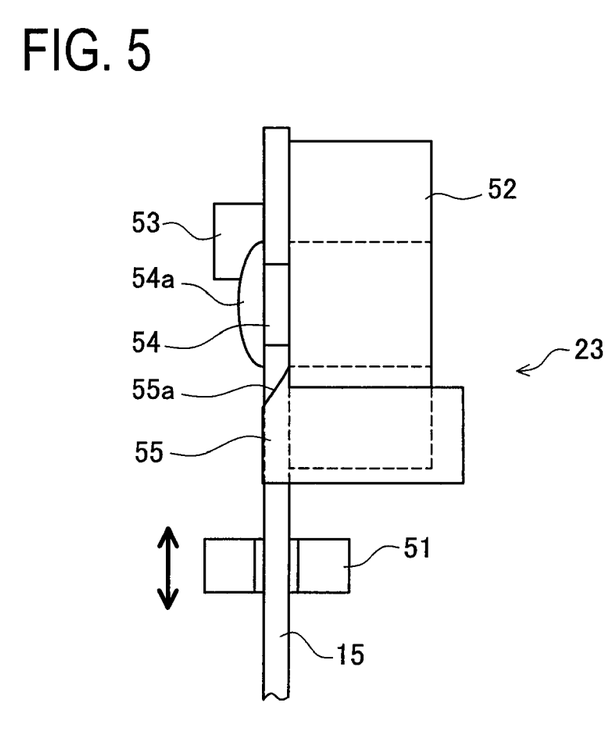
FIG. 5 is a side view of the winding machine taken along a line A-A in FIG. 4.

As shown in FIG. 1, the coil production apparatus 1 is provided with a winding machine 2 configured to automatically wind the flat rectangular conductive wire 15 in rectangular shape as mentioned above and an uncoiler 3 for supplying the conductive wire 15 to the winding machine 2. FIG. 4 is a schematic view showing a configuration of the winding machine 2 and the uncoiler 3. FIG. 5 is a side view of the winding machine 2 taken along a line A-A in FIG. 4. As shown in FIG. 4, the winding machine 2 includes a deforming mechanism 21, an annealing device 22, and a bending mechanism 23.

The uncoiler 3 includes: a rotary shaft 31 rotatably holding a bobbin 19 on which the flat rectangular conductive wire 15 is wound; and a motor 32 for rotating the rotary shaft 31. The uncoiler 3 is configured such that the bobbin 19 is driven to rotate by the motor 32 and the rotary shaft 31 to feed the conductive wire 15 from the bobbin 19. The conductive wire 15 is then supplied to the winding machine 2. The motor 32 can detect own torque T and rotating angular acceleration w and output information on the torque T and the rotating angular acceleration w. As will be described later, this information of the torque T and the rotating angular acceleration w means the information correlated to inertia I of the uncoiler 3. Therefore, the motor 32 corresponds to an inertia measuring device in the present invention, and moreover, corresponds to a characteristics measuring device for measuring the characteristics of a conductive wire. Herein, a relation among the torque T, the rotating angular acceleration w, and the inertia I of the motor 32 can be expressed by the following equation (1). Accordingly, by detecting the torque T and the rotating angular acceleration w of the motor 32, the inertia I can be obtained. This inertia I is one of the information reflecting the characteristics of the flat rectangular conductive wire 15.

$$I = T/w \tag{1}$$

Figure 6:
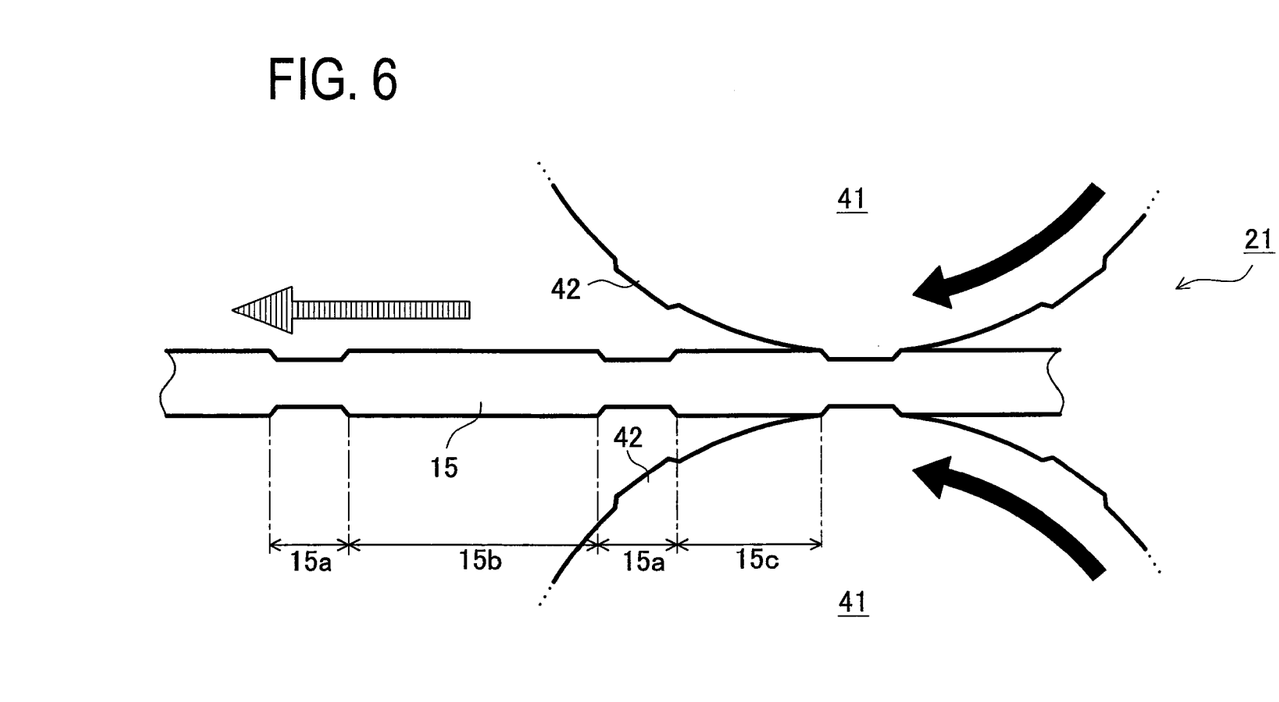
FIG. 6 is a schematic view showing one example of a deforming mechanism.

The deforming mechanism 21 is a mechanism for pressurizing the conductive wire 15 to change the thickness of the conductive wire 15. FIG. 6 is a schematic view showing one example of the deforming mechanism 21. The deforming mechanism 21 includes a pair of gear-shaped rollers 41 placed one above the other. The two gear-shaped rollers 41 are rotated in synchronization with each other. Each roller 41 is formed with recessed-surface forming teeth 42 on the outer periphery. This recessed-surface forming teeth 42 serve to uniformly reduce the thickness of the conductive wire 15 in a direction of a short side of a rectangular cross-section thereof.

The conductive wire 15 is formed with thickness changed portions 15a at predetermined pitches. These pitches are determined by positions corresponding to bent portions at four corners of the coil 10 shown in FIG. 2.

Figure 7:
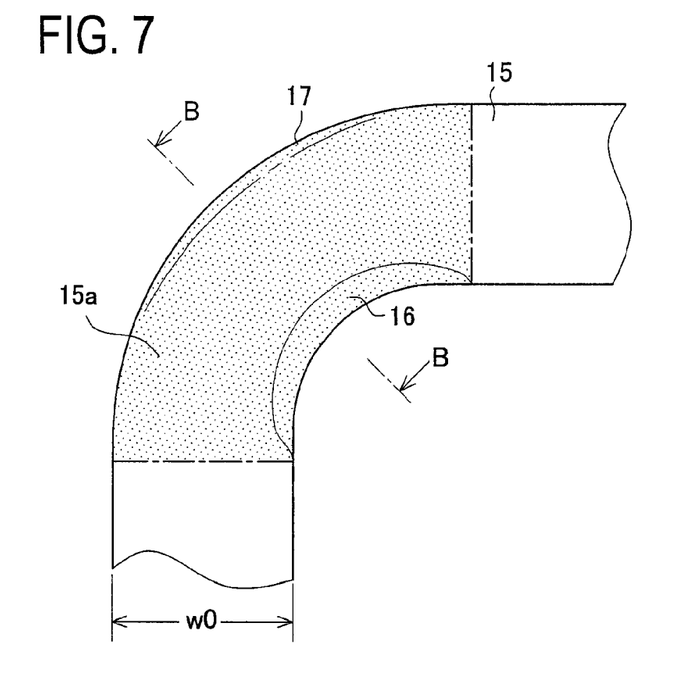
FIG. 7 is a plan view showing a schematic diagram of deformation when a flat rectangular conductive wire is edgewise bent.
Figure 8:
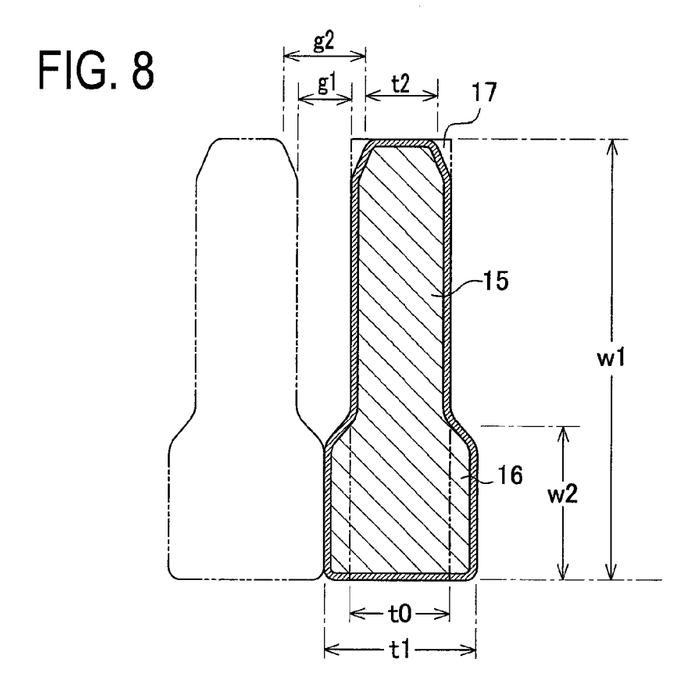
FIG. 8 is a sectional view of the flat rectangular conductive wire taken along a line B-B in FIG. 7.

Herein, an explanation is given to deformation that occurs during edgewise bending of the conductive wire 15. FIG. 7 is a schematic plan view showing the deformation caused when the conductive wire 15 is edgewise bent. FIG. 8 is a schematic sectional view of the conductive wire 15 taken along a line B-B in FIG. 7. When the conductive wire 15 is simply edgewise bent, a portion on the inner peripheral side is compressed while a portion on the outer peripheral side is stretched. Therefore, as shown in FIG. 7, a thickness increased portion 16 is formed on the inner peripheral side of the conductive wire 15 and a thickness decreased portion 17 is formed on the outer peripheral side of the conductive wire 15. Assuming the original width of the conductive wire 15 to be a normal width w0 (see FIG. 7) and the original thickness to be a normal thickness t0 (see FIG. 8), when the edgewise bending is conducted, the thickness on the inner peripheral portion becomes an inner peripheral thickness t1 thicker than the normal thickness t0 (see FIG. 8) and the thickness on the outer peripheral portion becomes an outer peripheral thickness t2 thinner than the normal thickness t0 (see FIG. 8). Further, the width of an edgewise bent portion becomes a bent portion width w1 (see FIG. 8) narrower than the normal width w0. The inner peripheral thickness t1 is thicker by about 12% than the normal thickness t0, forming the thickness increased portion 16. The outer peripheral thickness t2 is thinner by about 5% than the normal thickness t0, forming the thickness decreased portion 17. The bent portion width w1 tends to become narrower by about 9% than the normal width w0. A deformed portion width w2 of the thickness increased portion 16 is half or less of the normal width w0. This deformed portion width w2 changes depending on an edgewise bending condition.

When the conductive wire 15 is edgewise bent, the thickness increased portion 16 and the thickness decreased portion 17 are generated in each edgewise bent portion of the conductive wire 15. In forming the coil 10, the conductive wire 15 is bent and laminated with the inner peripheral thickness t1 due to each thickness increased portion 16. Thus, the adjacent portions having the normal thickness t0 are laminated with a central gap g1. Portions having the outer peripheral thickness t2 are laminated with an outer peripheral gap g2 which is larger than the central gap g1. This causes a problem that decreases the space factor.

Therefore, the thickness of the thickness changed portion 15a shown in FIGS. 2 and 7 is reduced in advance over almost the entire area of each portion to be bent as above. Such thickness changed portion 15a is located at each of four corners of the coil 10 as shown in FIG. 2. The thickness changed portions 15a therefore need to be formed so that the long side 15b and the short side 15c of the coil 10 are alternately arranged between the thickness changed portions 15a.

The pitches of the recessed-surface forming teeth 42 of each gear-shaped roller 41 in the deforming mechanism 21 of FIG. 6 are determined to repeat the long side 15b and the short side 15c. Furthermore, each tooth 13 of the stator core 12 has a substantially trapezoidal shape as shown in FIG. 3 and hence the inner periphery of the coil 10 differs between the coil outer peripheral terminal 10a side and the coil inner peripheral terminal 10b side. Accordingly, the pitches of the recessed-surface forming teeth 42 of the gear-shaped roller 41 are determined so that the short sides 15c of the flat rectangular conductive wire 15 are gradually longer from the short side 15c formed close to the inner peripheral terminal 10b to that formed close to the outer peripheral terminal 10a. The outer peripheral length of each roller 41 needs to be equal to or longer than the entire length of the coil 10 because the pitches between the teeth 42 are gradually changed as above. The thickness of each thickness changed portion 15a formed in the conductive wire 15 tends to have the inner peripheral thickness t1 thicker by about 12% than the normal thickness t0. Accordingly, it is preferable to squeeze the conductive wire 15 to a thickness thinner by about 10% to 12% than the normal thickness t0 by the teeth 42.

The annealing device 22 is configured to allow the conductive wire 15 to pass through the inside thereof and may be provided with a heater for heating the conductive wire 15. The conductive wire 15 is heated and annealed by passing through the annealing device 22. When passing through the deforming mechanism 21, the conductive wire 15 causes slight work hardening. It is therefore conceivable to soften the conductive wire 15 by heating after the process to anneal a work-hardened portion to prevent any influence during edgewise bending. Such softening the conductive wire 15 by heating also provides an advantage that facilitates the edgewise bending.

As shown in FIGS. 4 and 5, the bending mechanism 23 includes a feeding chuck 51 for moving the flat rectangular conductive wire 15, a rotary table 52, a fixing chuck 53, a shaft 54 with a guide portion serving as a bending jig, and a scraper 55. The feeding chuck 51 has a mechanism for taking the conductive wire 15 from the uncoiler 3 and feeding it at predetermined pitches. The conductive wire 15 needs to be wound with the long sides 15b and the short sides 15c being arranged alternately between the thickness changed portions 15a. Since the long sides 15b and the short sides 15c are gradually longer from the one close to the inner peripheral terminal 10b to the outer peripheral terminal 10a, the feeding chuck 51 is required to change a moving distance thereof from each thickness changed portion 15a at an appropriate position. Accordingly, the feeding chuck 51 is driven by a direct acting mechanism such as a servo mechanism to feed the conductive wire 15 by an arbitrary distance. In this embodiment, the feeding chuck 51 is configured to clamp the conductive wire 15 with a predetermined pressure, corresponding to a clamp device in the present invention.

As shown in FIGS. 4 and 5, the rotary table 52 is a 90-degree rotatable table and includes a rotary mechanism not shown capable of moving at a predetermined angle. One surface of the rotary table 52 will come into contact with the conductive wire 15 and the rotary table 52 is provided with the fixing chuck 53 capable of fixing the conductive wire 15. The fixing chuck 53 is placed on a surface of the rotary table 52 on which the conductive wire 15 is allowed to slide. The fixing chuck 53 is formed with a mechanism moving the fixing chuck 53 on the rotary table 52 to chuck or unchuck the conductive wire 15, thus having a function for holding the conductive wire 15. The surface which will hold the conductive wire 15 has been finished by surface treatment such as buffing to prevent damages on the insulating coating of the conductive wire 15 and others. The shaft 54 is placed to protrude from the surface of the rotary table 52 on which the conductive wire 15 will slide. An end of the shaft 54 is formed with a guide portion 54a that can contact with a side surface of the conductive wire 15 to prevent tilting of the conductive wire 15.

As shown in FIGS. 4 and 5, the scraper 55 is a plate provided with a tapered portion 55a. The tapered portion 55a of the scraper 55 is formed so as to scoop up the conductive wire 15 to be wound spirally. After one turn of the conductive wire 15, the conductive wire 15 is scooped up by the tapered portion 55a of the scraper 55 and will not collide or interfere with another portion of the conductive wire 15 fed by the feeding chuck 51.

Herein, the process of winding the coil 10 by the above-mentioned bending mechanism 23 is explained in order referring to FIGS. 9 to 14.

The flat rectangular conductive wire 15 wound around the bobbin 19 is supplied from the uncoiler 3 and fed to the bending mechanism 23 by the feeding chuck 51. At this time, the thickness changed portions 15a are formed in the conductive wire 15 by the deforming mechanism 21 and then the conductive wire 15 formed with the thickness changed portion 15a is heated in the annealing device 22.

Figure 9:
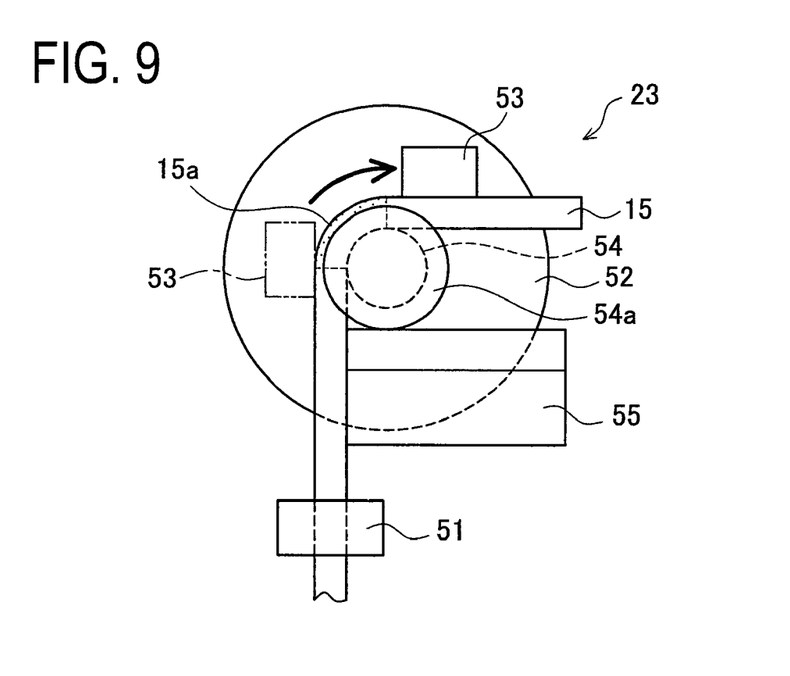
FIG. 9 is a schematic view of a bending mechanism showing a state that the flat rectangular conductive wire is bent at 90 degrees from the state shown in FIG. 4.
Figure 13:
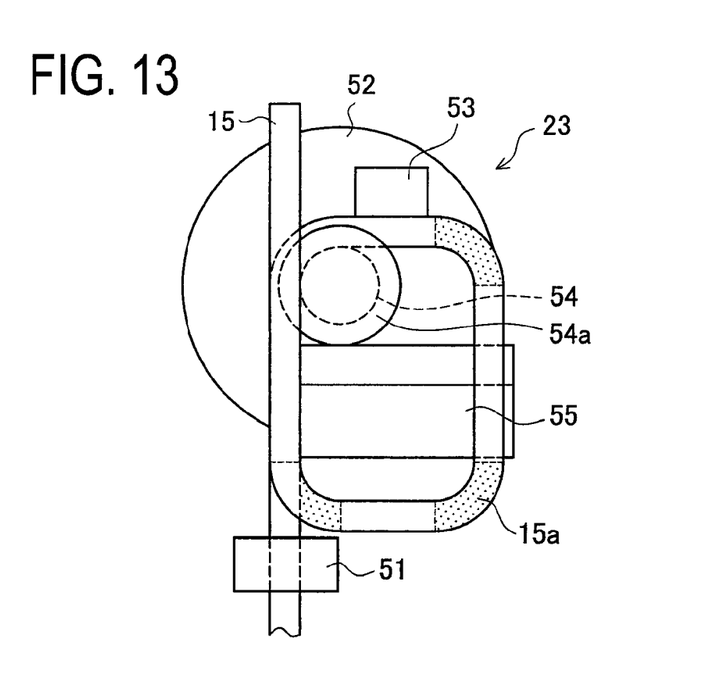
FIG. 13 is a schematic view of the bending mechanism showing a state that the flat rectangular conductive wire is stepwise bent from the state shown in FIG. 12.
Figure 14:
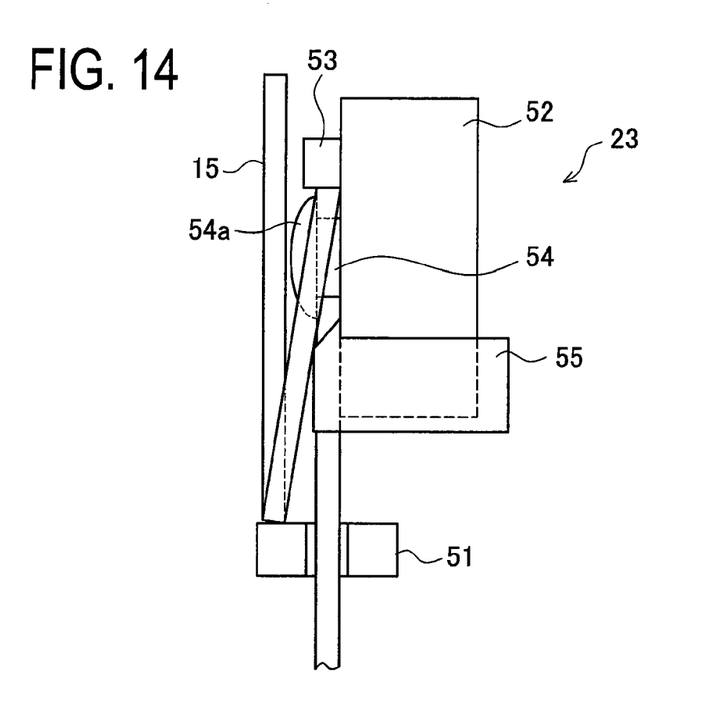
FIG. 14 is a side view of the bending mechanism in FIG. 13.

The conductive wire 15 having passed the annealing device 22 is then edgewise bent in the bending mechanism 23. FIG. 9 is a schematic view of the bending mechanism 23 showing a state where the conductive wire 15 is bent 90° from the state shown in FIG. 4. FIGS. 10 to 13 are schematic views showing the bending mechanism 23 bending the conductive wire 15 in stages from the state shown in FIG. 9. FIG. 14 is a side view of the bending mechanism 23 shown in FIG. 13.

In the state in FIG. 4, the conductive wire 15 is chucked by the fixing chuck 53. Then, the rotary table 52 is rotated to edgewise bend the conductive wire 15 along the shaft 54 as shown in FIG. 9. During this edgewise bending, the guide portion 54a of the shaft 54 serves to prevent the conductive wire 15 from tilting. A portion edgewise bent in FIG. 9 is hereafter referred to as a first bent portion.

The thickness changed portion 15a of the conductive wire 15 exactly corresponds to a portion to be edgewise bent. This thickness changed portion 15a has been formed thinner by the deforming mechanism 21 and therefore the thickness thereof becomes equal to the normal thickness t0 when the thickness increased portion 16 is formed as shown in FIG. 8.

Figure 10:
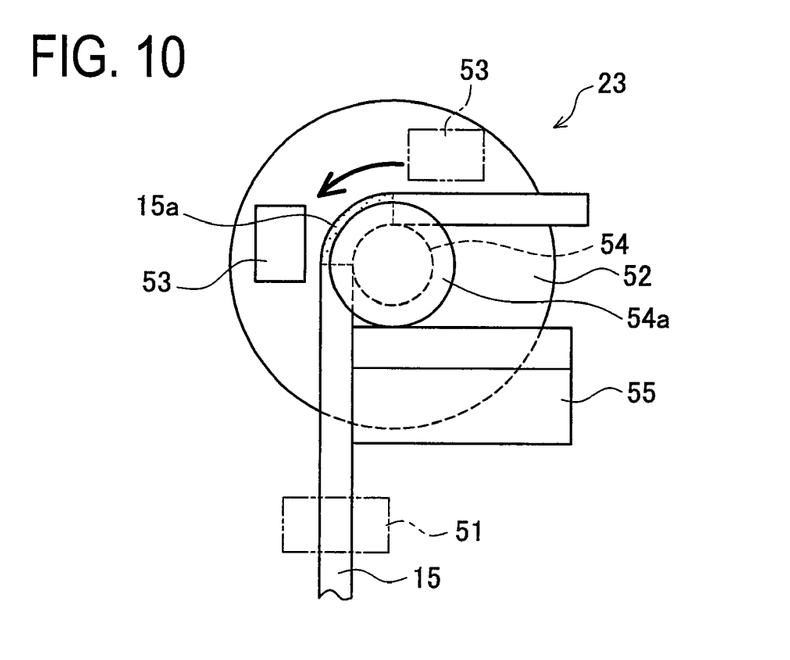
FIG. 10 is a schematic view of the bending mechanism showing a state that the flat rectangular conductive wire is stepwise bent from the state shown in FIG. 9.

After the thickness changed portion 15a of the conductive wire 15 is edgewise bent, the fixing chuck 53 unchucks the conductive wire 15 and returns to an original position as shown in FIG. 10. For preventing movement of the conductive wire 15 during such operation, an additional chuck not shown may be provided. Specifically, in the state shown in FIG. 10, the additional chuck holds the conductive wire 15 against movement before the fixing chuck 53 unchucks the conductive wire 15, the fixing chuck 53 then unchucks the conductive wire 15 and returns to the predetermined position, and then the fixing chuck 53 chucks the conductive wire 15 again and the additional chuck unchucks the conductive wire 15. Thus, the conductive wire 15 is held against movement.

As the additional chuck mechanism for the fixing chuck 53, for example, there is a method in which the shaft 54 is configured to move in an axial direction to apply fixed pressure to the conductive wire 15. When the shaft 54 is operated to press the guide portion 54a against the first bent portion of the conductive wire 15, thereby the position of the conductive wire 15 is fixed.

Figure 11:
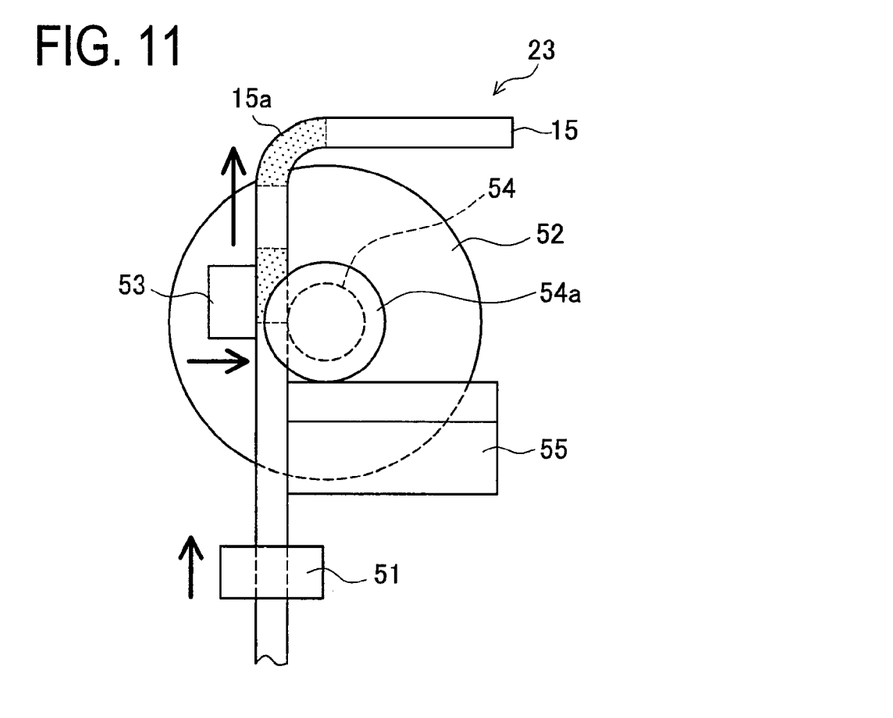
FIG. 11 is a schematic view of the bending mechanism showing a state that the flat rectangular conductive wire is stepwise bent from the state shown in FIG. 10.

As shown in FIG. 11, subsequently, the conductive wire 15 is fed by a predetermined pitch by the feeding chuck 51. The first bent portion of the conductive wire 15 is thus moved and a second bent portion to be bent is placed in contact with a side surface of the shaft 54. FIG. 11 shows a process of forming the short side 15c of the coil 10. Accordingly, the thickness changed portion 15a is located at a short interval and a feeding distance of the conductive wire 15 fed by the feeding chuck 51 is also short.

Figure 12:
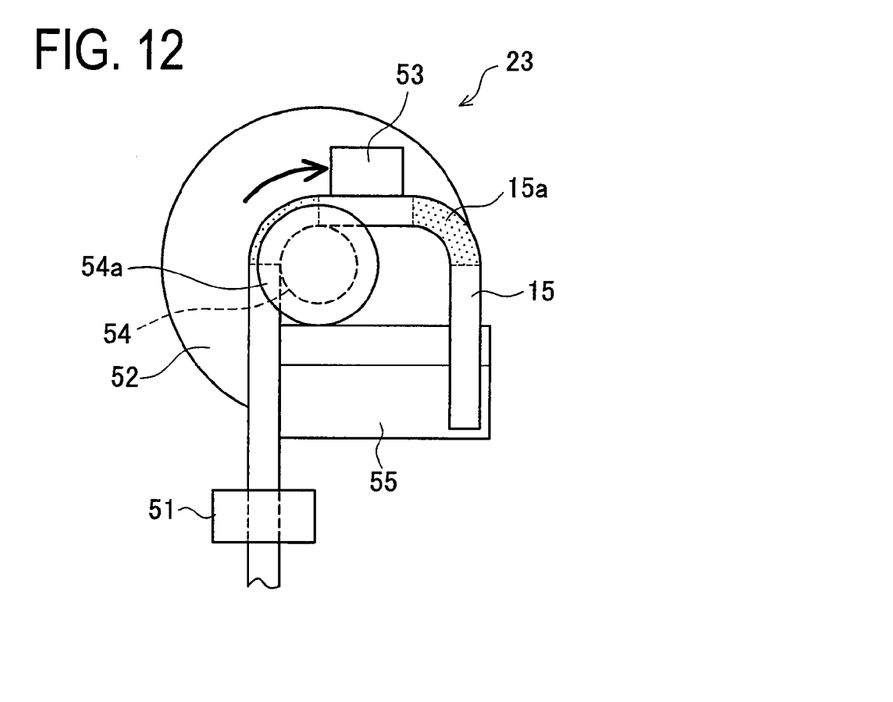
FIG. 12 is a schematic view of the bending mechanism showing a state that the flat rectangular conductive wire is stepwise bent from the state shown in FIG. 11.

The conductive wire 15 fed at the predetermined pitch is chucked again by the fixing chuck 53 and is edgewise bent as shown in FIG. 12. The second bent portion is thus formed. At that time, the leading end of the conductive wire 15 runs onto the scraper 55. The height of the scraper 55 is slightly higher than the thickness of the conductive wire 15. Accordingly, the conductive wire 15 is further edgewise bent to form a third and fourth bent portions. Thereby, a wound portion of the conductive wire 15 is laminated on another portion of the conductive wire 15 on a supply side of the bending mechanism 23 as shown in FIG. 13. FIG. 14 is a side view of the bending mechanism 23 in FIG. 13. FIG. 14 shows a state of laminating the conductive wire 15 without causing collision with a portion of the conductive wire 15 just behind the feeding chuck 51 by operation of the scraper 55.

When the coil 10 is wound as shown in FIG. 14, the gap between the portions of the conductive wire 15 is determined by the scraper 55. Therefore, depending on the positional relation thereof, the coil 10 is wound with gaps between the portions of the conductive wire 15. However, if the coil 10 is additionally compressed in the axial direction after winding by the bending mechanism 23, the coil 10 can be produced while the conductive wire 15 is laminated with no gap as shown in FIG. 2.

According to the above steps, the conductive wire 15 is wound as the coil 10. Each of the four corners of the coil 10 is formed with the thickness changed portion 15a in which the thickness thereof is thinned in advance and therefore returned to the normal thickness t0 when the thickness increased portion 16 is formed after edgewise bending. The cross-section at that time is almost equal to that in FIG. 8, a portion corresponding to the inner peripheral thickness t1 comes to have the same thickness as the normal thickness t0. The edgewise bent portion width w1 is slightly increased when the thickness changed portion 15a is formed. Accordingly, the edgewise bent portion width w1 is little wider than that in the case where the edgewise bending is conducted without forming the thickness changed portion 15a.

Even when the thickness increased portion 16 is generated as above, it becomes almost equal to the normal thickness t0. This prevents only the edgewise bent portion from bulging when the flat rectangular conductive wire 15 is wound and laminated as the coil 10, thereby avoiding formation of gaps between adjacent portions of the conductive wire 15 due to interference of bulges. This makes it possible to enhance the space factor of the coil 10 when mounted in the teeth 13 of the stator core 12.

The above-mentioned coil production apparatus 1 is, as shown in FIG. 1, provided with: an operating console 4 for automatically setting the winding condition of the winding machine 2 and controlling the winding machine 2; a conductive wire identifying device 5 for identifying the kind (material) of the conductive wire 15; a first chuck 6 for chucking a rear end portion of the conductive wire 15 wound around the bobbin 19 set in the uncoiler 3 and measuring the electric resistance therein; a second chuck 7 for similarly chucking a leading end of the conductive wire 15 and measuring the electric resistance therein; and the aforementioned motor 32 corresponding to an inertia measuring device for measuring the inertia generated by the uncoiler 3. The first and second chucks 6 and 7 correspond to the characteristics measuring device and the resistance measuring device in the invention. In the present embodiment, a "bent angle" of the conductive wire 15 to be edgewise bent and "clamp pressure" applied to the conductive wire 15 by the feeding chuck 51 constituting the bending mechanism 23 are adopted as parameters of the winding condition of the winding machine 2. The operating console 4 sets this winding condition to a predetermined value to control the bending mechanism 23 of the winding machine 2 based on such set condition. Specifically, the operating console 4 controls each operation of the feeding chuck 51, the rotary table 52, the fixing chuck 53, and the scraper 55.

As shown in FIG. 1, for example, a bobbin 19A on which a conductive wire 15 made of aluminum enamel wire is wound and accumulated or a bobbin 19B on which a conductive wire 15 made of copper enamel wire is wound and accumulated is set for use in the uncoiler 3. The motor 32 is arranged to output the information of the torque T and the rotating angular acceleration w correlated to the inertia I generated when the conductive wire 15 is fed from the bobbin 19 set in the uncoiler 3, the information is output to the conductive wire identifying device 5. The first chuck 6 chucks the rear end portion of the conductive wire 15, the rear end portion being exposed by removal of the insulating coating, measures the electric resistance of the rear end portion, and then outputs a measured value to the conductive wire identifying device 5. The second chuck 7 chucks the leading end portion of the conductive wire 15, the leading end portion being exposed by removal of the insulating coating, measures the electric resistance of the leading end portion, and then outputs a measured value to the conductive wire identifying device 5.

Figure 15:
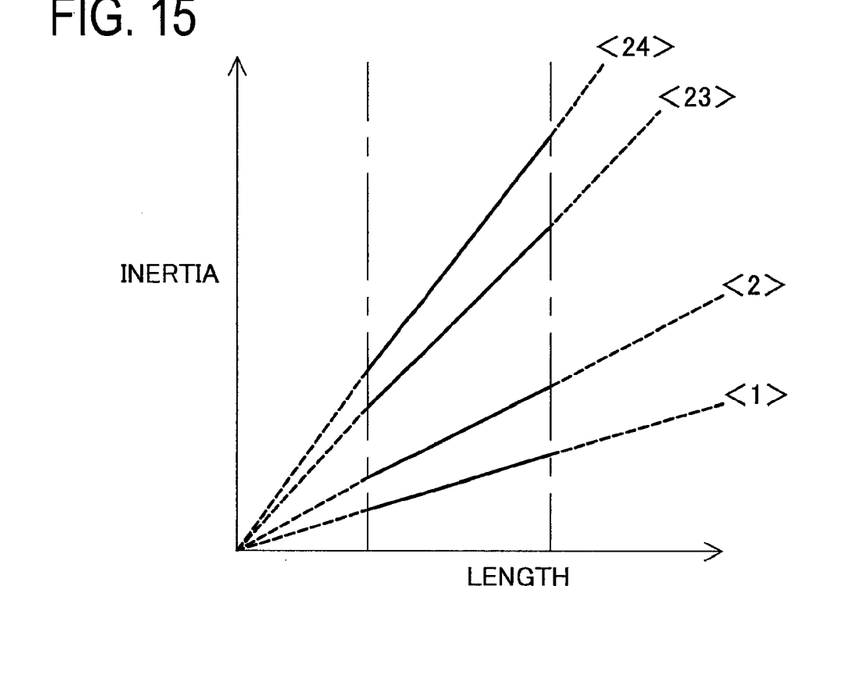
FIG. 15 is a graph showing a relation among different materials, length in each cross-sectional area, and inertia.
Figure 16:
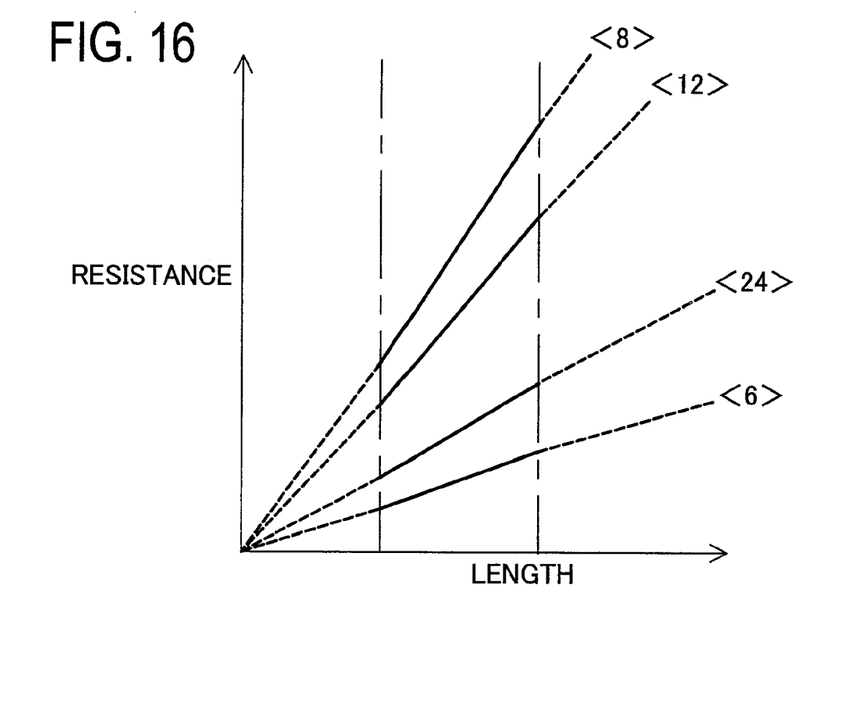
FIG. 16 is a graph showing a relation among different materials, length in each cross-sectional area, and resistance.

The conductive wire identifying device 5 receives the resistance value measured by the first chuck 6, the resistance value measured by the second chuck 7, and the information of the torque T and the rotating angular acceleration w from the motor 32, and identifies the kind of the conductive wire 15 wound on the bobbin 19 set in the uncoiler 3. The conductive wire identifying device 5 includes a central processing unit (CPU) and a memory. The CPU identifies the kind (material) of the conductive wire 15 based on a program stored in the memory. In the memory, relations between various parameters are stored in advance as characteristics data as shown in FIGS. 15 and 16. FIG. 15 is a graph showing a relation among different materials, length in each cross-sectional area, and the inertia. FIG. 16 is a graph showing a relation among different materials, length in each cross-sectional area, and the resistance. In the figures, each numerical sign indicates individual material. After having determined the resistance value and the inertia in advance, the characteristics data is created so that the winding condition is determined uniquely. In case there are two or more kinds to be selected (or to meet the condition), the kind may be uniquely determined by changing the length (feeding amount). The CPU of the conductive wire identifying device 5 receives the input information of the torque T and the rotating angular acceleration w and calculates the inertia I based on the aforementioned equation (1). Then, the CPU of the conductive wire identifying device 5 identifies the kind of the currently used conductive wire 15 from the information such as the input resistance value, the calculated inertia I obtained by the characteristics data, and the characteristics data in FIGS. 15 and 16 itself. Thus obtained identifying result is output from the CPU to the operating console 4.

Figure 17:
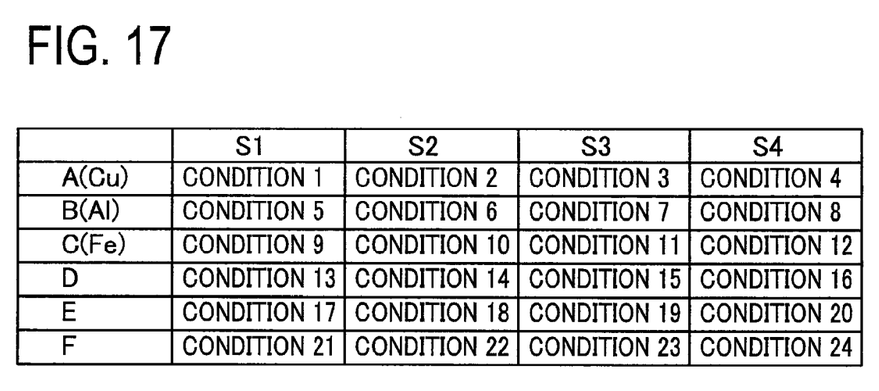
FIG. 17 is a table showing a relational data of each different kind of conductive wires, cross-sectional areas, and winding conditions.

The operating console 4 receives the identifying result representing the kind of the conductive wire 15 from the conductive wire identifying device 5. Based on that result, the winding condition of the winding machine 2 is determined. The operating console 4 includes a central processing unit (CPU) and a memory. The CPU determines the winding condition based on a program stored in the memory. The memory stores, for example, relational data among conductive wires made of different materials A(Cu), B(Al), C(Fe), D, E, and F, cross-sectional areas S1, S2, S3, and S4, and winding conditions 1 to 24 in advance as described in a table of FIG. 17. This relational data is made to set the most preferable winding condition for each combination of the different kinds of conductive wires A to F and the cross-sectional areas S1 to S4. The CPU of the operating console 4 determines the winding condition from the received identifying result based on the relational data, thus controlling the winding machine 2 based on the set winding condition.

According to the above mentioned coil production apparatus 1 in the present embodiment, the conductive wire 15 fed from the uncoiler 3 is smoothly supplied to the winding machine 2 and wound by the winding machine 2 to be produced as the coil 10. Herein, the winding machine 2 is provided with: the feeding chuck 51 for clamping the conductive wire 15 at a predetermined pressure; the rotary table 52 for bending the conductive wire 15 at a predetermined angle; the fixing chuck 53; the shaft 54 with the guide; and the scraper 55. Then, the operating console 4 sets, as the winding condition, a clamping pressure to be applied by the feeding chuck 51 and a bending angle to be attained by the rotary table 52, the fixing chuck 53, the shaft 54, and the scraper 55. Further, the mechanism of the feeding chuck 51 is controlled by the operating console 4 based on the set value of the clamping pressure while the mechanism of the rotary table 52, the fixing chuck 53, the shaft 54, and the scraper 55 is controlled by the operating console 4 based on the set value of the bending angle.

As the characteristics of the conductive wire 15 to be used, the torque T and the rotating angular acceleration w correlated to the inertia I of the uncoiler 3 is measured by the motor 32. Similarly, as the characteristics of the conductive wire 15 to be used, the resistance value of the wire is measured by the first and second chucks 6 and 7. The torque T and the rotating angular acceleration w obtained by the motor 32 and the resistance values of the conductive wire 15 are input to the conductive wire identifying device 5. Based on those information, the identifying device 5 identifies the kind of the conductive wire 15. Furthermore, that identified result of the kind of the conductive wire 15 is input to the operating console 4 from the identifying device 5 so that the operating console 4 determines the winding condition based on the identified result and controls the winding machine 2 based on the thus determined winding condition. Consequently, even if a conductive wire 15 of a different kind is to be used, this conductive wire 15 can be wound by the winding machine 2 based on the winding condition appropriate to the characteristics of the conductive wire 15. As a result, each edgewise-bent type conductive wire 15 can be properly wound according to a difference in material of the conductive wire 15 to be used, so that the coil 10 is properly produced. Therefore, the produced coil 10 can be prevented from having undesired twist(s).

In the future, it is hardly conceivable to occur any major changes in a basic method of manufacturing a motor, but the types of motors may be diversified in response to demands for higher performance and therefore coils to be used for a stator of a motor may also be diversified. Diversification of the coil is broadly divided into the material and the cross-sectional area (diameter and shape). Under those circumstances, the coil production apparatus 1 in the present embodiment can share the winding machine 2 among different kinds of conductive wires 15 and can automatically identify the kind of the conductive wire 15 even when diversified. It is therefore avoidable that the conductive wire 15 to be used is identified wrongly due to a human error. Thus, the coil 10 can be properly produced.

The present invention is not limited to the above mentioned embodiment and may be embodied in other specific forms without departing from the essential characteristics thereof as described below.

In the above embodiment, the invention is embodied in the form to produce the coil 10 utilizing the flat rectangular conductive wire 15. Alternately, a circular or round conductive wire may be used as a conductive wire to produce a coil.

INDUSTRIAL APPLICABILITY

This invention may be used for production of a coil for use in a motor stator.

REFERENCE SIGNS LIST

1 Coil production apparatus
2 Winding machine
3 Uncoiler
4 Operating console
5 Conductive wire identifying device
6 First chuck (Characteristics measuring device, Resistance measuring device)
7 Second chuck (Characteristics measuring device, Resistance measuring device)
10 Coil
11 Stator
15 Flat rectangular conductive wire (Conductive wire)
19 Bobbin
21 Deforming mechanism
22 Annealing device
23 Bending mechanism
32 Motor (Characteristics measuring device, Inertia measuring device)
51 Feeding chuck (Clamp device)
52 Rotary table (Bending device)
53 Fixing chuck (Bending device)
54 Shaft with guide (Bending device)
55 Scraper (Bending device)

The invention claimed is:

1. An apparatus for producing a coil to be used for a stator of a motor by automatically winding a conductive wire by use of a winding machine, the apparatus comprising:
a characteristics measuring device that measures characteristics of the conductive wire;
a conductive wire identifying device that identifies a kind of the conductive wire based on the measured characteristics;
a winding condition setting device that sets a winding condition of the conductive wire to be wound by the winding machine based on the identified kind of the conductive wire; and
a control device that controls the winding machine based on the set winding condition.

2. The apparatus for producing the coil described in claim 1, wherein
the conductive wire wound and accumulated on a bobbin is fed from an uncoiler and is wound by the winding machine.

3. The apparatus for producing the coil described in claim 2, wherein
the characteristics measuring device includes:
an inertia measuring device that measures inertia of the uncoiler when feeding the conductive wire; and
a resistance measuring device that measures a resistance value of the conductive wire.

4. The apparatus for producing the coil described in claim 2, wherein,
the winding machine includes:
a clamp device that clamps the conductive wire at a predetermined pressure; and
a bending device that bends the conductive wire at a predetermined bending angle,
the winding condition setting device sets the pressure to be applied by the clamp device and the bending angle to be attained by the bending device, and
the control device controls the clamp device based on the set pressure value and controls the bending device based on the set bending angle.

5. The apparatus for producing the coil described in claim 3, wherein,
the winding machine includes:
a clamp device that clamps the conductive wire at a predetermined pressure; and
a bending device that bends the conductive wire at a predetermined bending angle,
the winding condition setting device sets the pressure to be applied by the clamp device and the bending angle to be attained by the bending device, and
the control device controls the clamp device based on the set pressure value and controls the bending device based on the set bending angle.

\* \* \* \* \*